US011599452B2

(12) United States Patent
Hachmeister et al.

(10) Patent No.: US 11,599,452 B2
(45) Date of Patent: Mar. 7, 2023

(54) USER DIRECTED PARTIAL GRAPH EXECUTION

(71) Applicant: MICROSOFT TECHNOLOGY LICENSING, LLC, Redmond, WA (US)

(72) Inventors: Damon Robert Hachmeister, North Grafton, MA (US); Hai Ning, Cambridge, MA (US); Lidiane Souza Jones, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 16/692,424

(22) Filed: Nov. 22, 2019

(65) Prior Publication Data
US 2020/0089600 A1 Mar. 19, 2020

Related U.S. Application Data

(63) Continuation of application No. 14/884,453, filed on Oct. 15, 2015, now Pat. No. 10,496,528.
(Continued)

(51) Int. Cl.
*G06F 3/04842* (2022.01)
*G06F 3/04812* (2022.01)
(Continued)

(52) U.S. Cl.
CPC ...... *G06F 11/3684* (2013.01); *G06F 3/04812* (2013.01); *G06F 3/04817* (2013.01); *G06F 3/04842* (2013.01); *G06F 9/44* (2013.01)

(58) Field of Classification Search
CPC ............. G06F 11/3684; G06F 3/04812; G06F 3/04817; G06F 3/04842; G06F 9/44
See application file for complete search history.

(56) References Cited

U.S. PATENT DOCUMENTS

| 7,093,207 B1* | 8/2006 | Liao ...................... G06Q 10/06 707/999.203 |
| 7,331,039 B1 | 2/2008 | Yip et al. |
| 2004/0034858 A1 | 2/2004 | Kushlis |
| 2005/0060129 A1 | 3/2005 | Mosterman et al. |

(Continued)

FOREIGN PATENT DOCUMENTS

| CN | 1469240 A | 1/2004 |
| CN | 1609809 A | 4/2005 |

(Continued)

OTHER PUBLICATIONS

"Second Office Action Issued in Chinese Patent Application No. 201680049279.X", dated Sep. 27, 2020, 8 Pages.
(Continued)

*Primary Examiner* — Jennifer N Welch
*Assistant Examiner* — Reji Kartholy
(74) *Attorney, Agent, or Firm* — Workman Nydegger (57) ABSTRACT

Executing a user selected portion of an executable graph, the method includes, for an executable graph, the executable graph comprising executable modules, identifying a user selected sub-portion of the executable graph. The method further includes determining that data is needed from upstream modules in the graph to execute the sub-portion of the executable graph. The method further includes obtaining the needed data. The method further includes executing the user selected sub-portion of the graph in isolation from other portions of the executable graph. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

20 Claims, 10 Drawing Sheets

Related U.S. Application Data (60) Provisional application No. 62/212,429, filed on Aug. 31, 2015.

(51) Int. Cl.
   *G06F 11/36* (2006.01)
   *G06F 3/04817* (2022.01)
   *G06F 9/44* (2018.01)

(56) References Cited

U.S. PATENT DOCUMENTS

| | | | | |
|---|---|---|---|---|
| 2005/0160397 | A1* | 7/2005 | Szpak | G06F 9/542 717/104 |
| 2007/0168742 | A1* | 7/2007 | Wadsworth | G06F 11/3684 714/E11.207 |
| 2010/0050151 | A1* | 2/2010 | Balasubramanian | G06F 8/33 717/105 |
| 2012/0331444 | A1* | 12/2012 | Szpak | G06F 9/451 717/105 |
| 2017/0004173 | A1* | 1/2017 | Simitsis | G06F 16/24542 |
| 2017/0060386 | A1 | 3/2017 | Hachmeister et al. | |
| 2018/0225016 | A1* | 8/2018 | Stanfill | G06F 3/0482 |
| 2021/0383896 | A1* | 12/2021 | Wang | G06F 16/951 |

FOREIGN PATENT DOCUMENTS

| | | |
|---|---|---|
| CN | 1702692 A | 11/2005 |
| CN | 1965293 A | 5/2007 |
| CN | 101479701 A | 7/2009 |
| CN | 102135905 A | 7/2011 |
| CN | 103049164 A | 4/2013 |
| CN | 103678963 A | 3/2014 |
| CN | 101617292 B | 9/2014 |
| CN | 104050029 A | 9/2014 |
| EP | 1480121 A3 | 7/2005 |

OTHER PUBLICATIONS

"Notice of Allowance and Search Report Issued in Chinese Patent Application No. 201680049279.X", dated Jan. 25, 2021, 6 Pages.

"Office Action and Search Report issued in Chinese Patent Application No. 201680049279", dated Jul. 3, 2020, 24 Pages.

"Office Action Issued in European Patent Application No. 16760848.8", dated Apr. 7, 2020, 05 Pages.

"Notice of Allowance Issued in European Patent Application No. 16760848.8", dated Mar. 31, 2022, 2 Pages.

* cited by examiner

Properties

◢ Execute R Script

| Run Module | ─ 304 |

306

R Script ≡

```
1  # Map 1-based optional input ports to variables
2  dataset1 <- maml.mapInputPort(1)  # class: data.frame
3  dataset2 <- maml.mapInputPort(2)  # class: data.frame
4
5  # Contents of optional Zip port are in ./src/
6  # source("src/yourfile.R");
7  # load("src/yourData.rdata");
8
9  # Sample operation
10 data.set " rbind(dataset1, dataset2);
11
12 #You'll see this output in the R Device port.
13 # It'll have your stdout, stderr and PNG graphics device(s).
14 plot(data.set);
15
16 print(i);
17
18 #Select data.frame to be sent to the output Dataset port
19 maml.mapOutputPort("data.set");
```

308

Random Seed ≡

Properties

◢ Reader

Data Source

| Azure Blob Storage ⌄ |

Authentication Type

| Account ⌄ |

Account Name

| ⓘ |

Account Key

| ⓘ |  ← 506

Path to Container, Director...

| ⓘ |

Blob File Format

| CSV ⌄ |

☐ File Has Header Row

☐ Use Previous Run Results  ← 502

USER DIRECTED PARTIAL GRAPH EXECUTION

CROSS-REFERENCE TO RELATED APPLICATIONS

This application is a continuation of U.S. patent application Ser. No. 14/884,453 filed on Oct. 15, 2015, issued on Dec. 3, 2019 as U.S. Pat. No. 10,496,528 entitled "User Directed Partial Graph Execution," which claims the benefit of and priority to U.S. Provisional Patent Application Ser. No. 62/212,429 filed on Aug. 31, 2015 and entitled "User Directed Partial Graph Execution," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

One method of programming computers involves the use of graphical execution workflows. In a graphical execution workflow, functional modules or nodes of a graph are created which perform various functions. The modules of the graph are coupled to each other through edges. In a typical scenario, data will flow downstream through the modules of a graph by the edges. Thus, upstream modules will create data, which is then passed to downstream modules, which can operate on the data to create new data, which can be further passed on to still further downstream modules.

When developing applications using graphical execution workflows, portions of a graph may be modified. To test the modified portions, the graph is re-executed so that data from upstream modules can flow to the modified portions of the graph. Thus, for relatively small changes to a graph, large amounts of execution of other parts of the graph may take place to test the small changes The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for executing a user selected portion of an executable graph. The method includes, for an executable graph, the executable graph comprising executable modules, identifying a user selected sub-portion of the executable graph. The method further includes determining that data is needed from upstream modules in the graph to execute the sub-portion of the executable graph. The method further includes obtaining the needed data. The method further includes executing the user selected sub-portion of the graph in isolation from other portions of the executable graph. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In a graphical execution workflow, there are situations where a user might not want to execute a graph in its entirety. Embodiments herein allow a user to select a sub-portion of a graph for execution. Necessary input state(s) can be made available to execute the sub-portion of the graph using relevant cached data as inputs, using random data as inputs, by allowing the user manually input data, by suggesting to the user additional portions of the graph to execute, etc. In addition to allowing for quick iterations on graph modifications, this approach allows users to purposely exclude specific modules from execution. For example, if a module executing has side-effects that the user does not want to manifest unless an entire graph is executed, the user can exclude this module from execution. Execution of a graph stops when an entire user-selected subgraph is executed. Thus, portions of a graph can be executed without the need to execute the entire graph.

There are various situations where executing an entire graph is not ideal for a user. For example, if a user is editing an individual module the user may like to see the effects of the change only on this module's output. This holds especially true for scripting modules. Forcing a user to execute an entire graph when they are troubleshooting or iterating on their R, Python, SQL or other script may be excessive.

In another example, a user may not want to execute particular modules. For example, a user may not want to execute a writer module at the end of an experiment. Alternatively or additionally, a user may not want to execute a long-running module or branch of an experiment. Alternatively or additionally, a user may not want to execute a module or branch of an experiment that: has a known error; is time consuming; is not needed for an immediate task; etc.

In another example, a user may want to execute only a particular cluster of modules. For example, the user may be able to determine that the logic of the graph is incorrect and output is not as expected in some area of the graph. In this case, the user may wish to fix and execute this block of the experiment, without needing to execute the entire graph, to see if a change has remedied the issue.

In another example, a user may want to mark a non-deterministic module to be deterministic.

Various embodiments illustrated herein may facilitate certain functionality. For example, embodiments may be implemented to toggle the deterministic behavior of a non-deterministic module. Embodiments may be implemented to execute a single module in an experiment, using upstream cached values (or otherwise obtained values) as inputs to the single module. Embodiments may be implemented to execute a range of modules in an experiment, using upstream cached values (or otherwise obtained values) as inputs and halting execution when the range is complete. Embodiments may be implemented to mark an individual module to not execute. Embodiments may be implemented to exclude a branch of an experiment from executing by choosing the stop point as mentioned above. Details are now illustrated.

User-directed graph execution enables users to choose which portions of their experiment to execute. This can be useful when a user is iterating on a subset of their experiment, when they do not want to execute non-deterministic sections of their experiment, when they want to exclude failing modules or modules with side-effects etc.

Some embodiments may be based on Azure Machine Learning available from Microsoft Corporation of Redmond, Wash.

The following now illustrates where a user may want to execute only a particular cluster of modules.

Figure 1A:
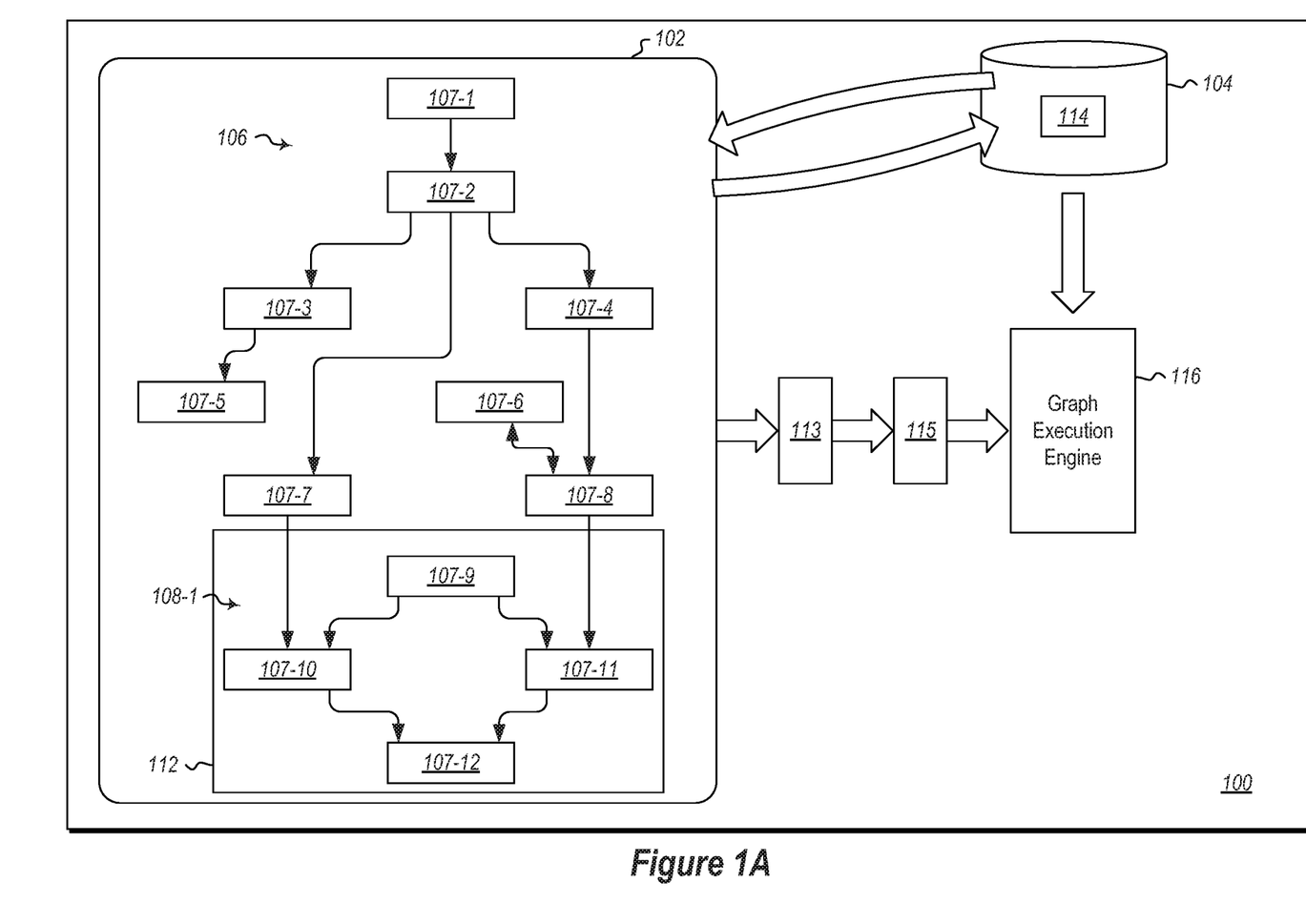
FIG. 1A illustrates a graph execution system.

Referring now to FIG. 1A, a graph execution system 100 is illustrated. The graph execution system 100 includes a user interface 102. The user interface 102 may be used by a user to select a group of modules to execute from a graph 106. In particular, the system 100 includes storage 104 which stores executable graphs. A graph 106, which includes various modules 107-1 through 107-12 can be rendered in the user interface 102. A user can select a sub-portion 108-1 of the graph 106 to execute. In the embodiment illustrated, a user "rubber-bands" a sub-portion 108-1 of their graph, including modules 107-9 through 107-12 by dragging a boundary box 112 around the modules in the sub-portion 108-1.

Figure 1B:
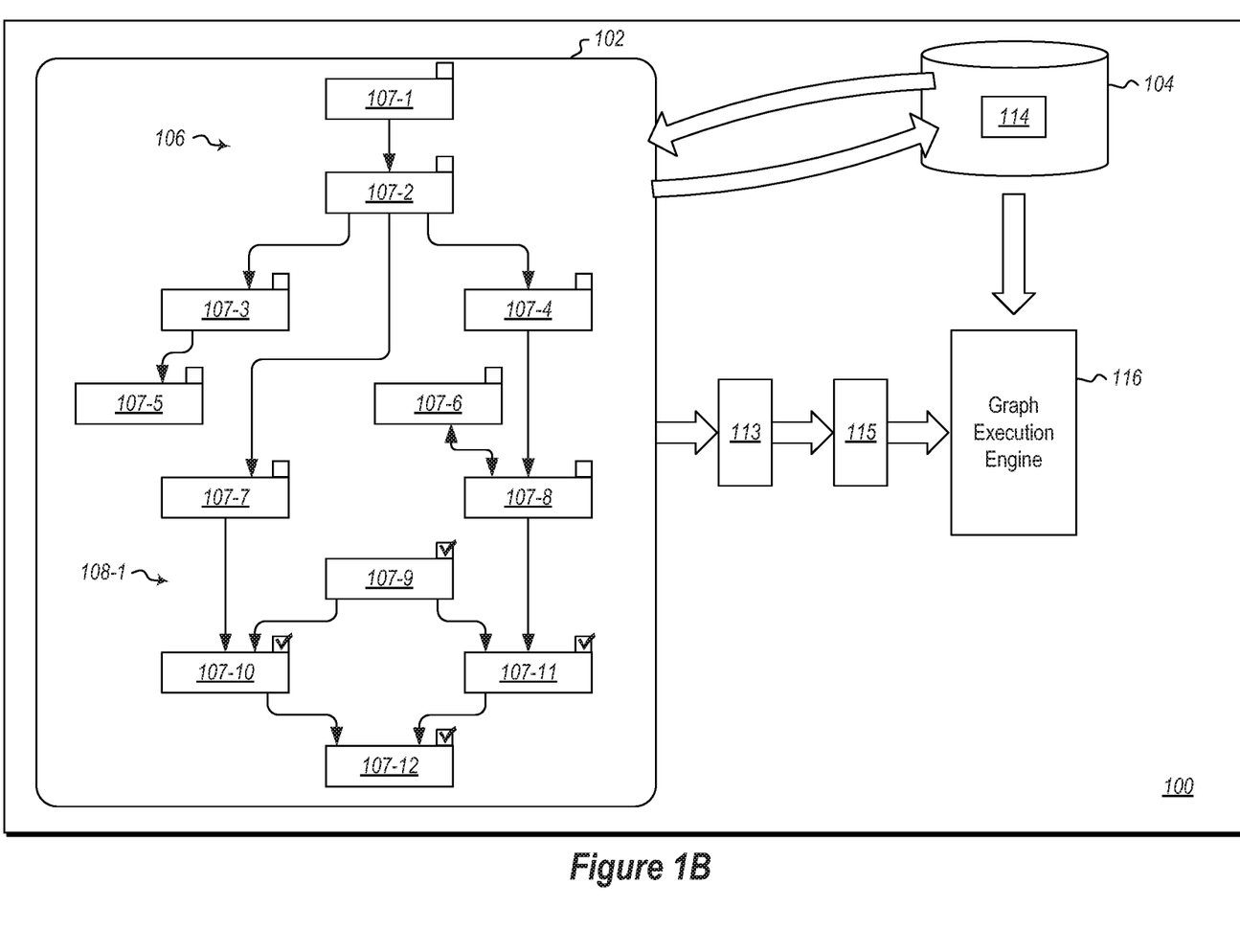
FIG. 1B illustrates alternative user interface elements for the graph execution system.

However, selecting modules to be executed can be performed in a number of different fashions. For example, FIG. 1B illustrates that each of the modules (referred to herein generically as 107) include a check box. To select an individual module to execute, an associated check box can be selected.

In another example, the user interface 102 may allow a user to select modules to execute by modifying a property. For example, a user could right click a module, which could cause a selection of properties to be displayed. One of those properties could be a "run" property indicating that the module should be executed in a partial graph execution scenario.

In another example, a user may be able to use various keyboard shortcuts, such as selecting a module using a mouse or other pointer, and then using ctrl in combination with arrow keys to select various modules.

In still other embodiments, users may be able to use various pen and tablet selection tools to allow a user to select module.

In still other embodiments, users may be able to use gestures to select modules, such as touch pad gestures, or hand gestures when using augmented reality, projected interfaces such as the HoloLens system available from Microsoft Corporation of Redmond, Wash., or other interfaces such as the Kinect interface available from Microsoft Corporation of Redmond, Wash.

Figure 2:
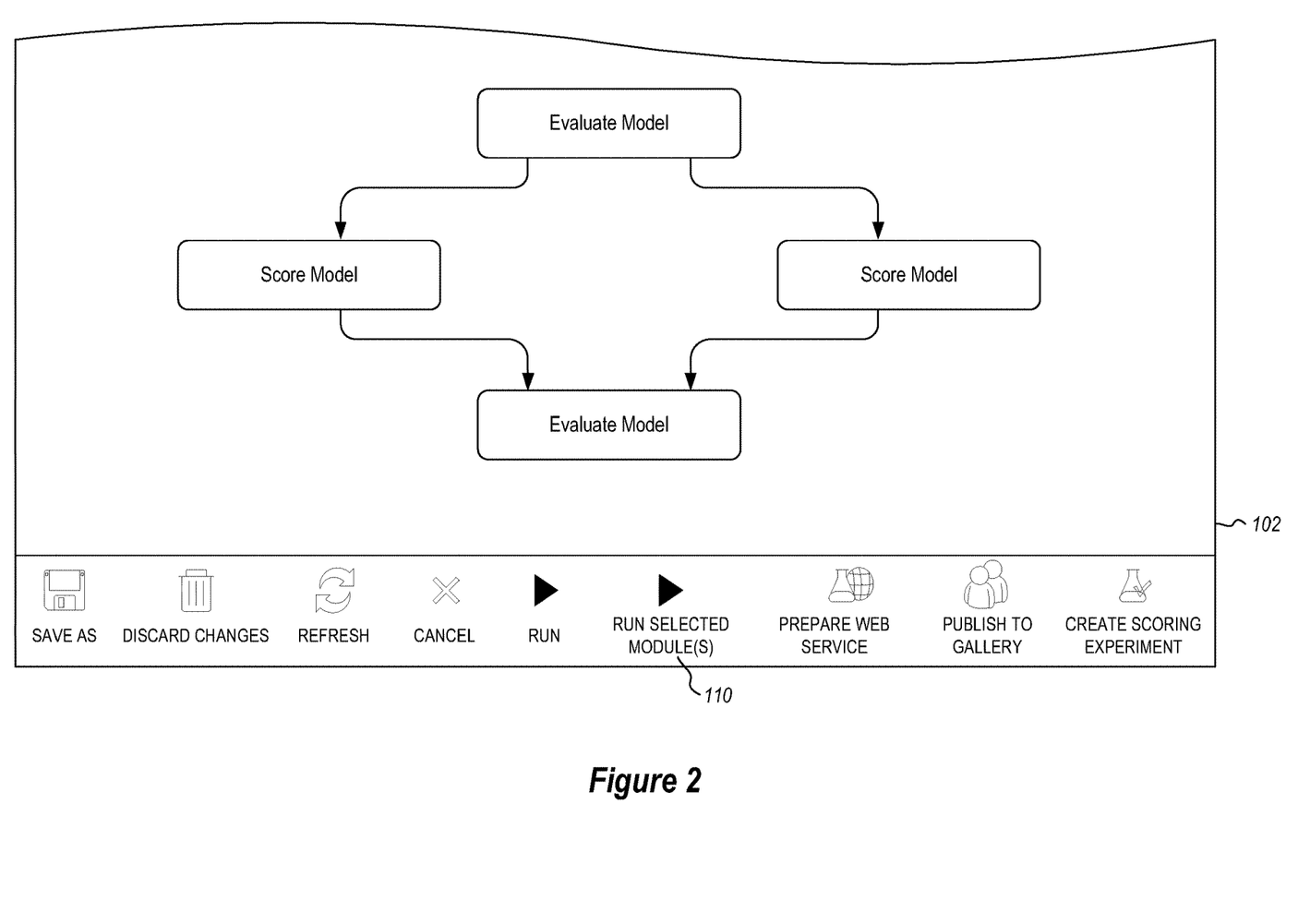
FIG. 2 illustrates user interface elements of the graph execution system.

When one or more modules are selected by a user, the user interface 102 may include elements to allow a user to indicate that the modules should be executed. For example, FIG. 2 illustrates a 'Run Selected Module(s)' button 110 displayed in the user interface 102. The button 110 may be displayed when modules are selected. Alternatively or additionally, the button 110 may be displayed, but grayed out until modules are selected. Once modules are selected, the button 110 may become un-grayed on the user interface 102 allowing the user to select the button 110 and cause the modules to be executed.

When a user selects the button 110, only the selected modules in the sub-portion 108-1 will run by a graph execution engine 116 configured to execute graph modules, with the caveat that if required upstream data is not available from some other source (such as a cache, user input, randomly generated values, etc.), some upstream modules may be executed as illustrated in more detail below.

Upstream data needed to execute modules in the sub-portion 108 may be obtained in a number of different ways. For example, in some embodiments, data can be obtained from previous executions of the graph 106. In particular, the graph 106 may have been partially or fully executed at a prior time. Data values generated during that run may be stored in a cache 114. Thus, any needed data that is available in the cache 114 from a previous execution of all or portions of the graph 106 may be used. For example, in the illustrated example, data values may be needed from modules 107-7 and 107-8 to execute the sub-portion 108-1. If the graph 106 has been executed previously, values from those modules may have been stored in the cache 114 and can be re-used to execute the sub-portion 108-1.

The cache 114 may be, for example, a table with a key and a corresponding value. The key identifies a module, and the value identifies a data value that the module has previously produced in a previous run. In some embodiments, the key identifying the module may be a checksum value generated for the module. In some embodiments, the version of a module is incorporated into the checksum value used as the key. In this way a value generated by an appropriate version of an upstream module can be identified for use in a partial graph execution.

This works well for deterministic data values. However, it should be appreciated that in some embodiments, data generated by an upstream graph may be non-deterministic. For example, data values from upstream graphs may be generated using random numbers or operations. Data values may be based on current time, etc. For partial execution, however, embodiments may nonetheless use cached data with the knowledge that any data produced by the partial execution may not be reliable or may be out of date. In fact, as illustrated in more detail below, in some embodiments, when a partial execution is performed, cached data for modules downstream from a sub-portion will be marked as "not run" and cached data for those modules may be invalidated.

Other methods may be used to obtain needed upstream data when performing a partial graph execution. For example, in some embodiments, the graph execution engine 116 may determine that upstream data from modules 107-7 and 107-8 is needed to execute the sub-portion 108-1. In some embodiments, the graph execution engine 116 can prompt the user using the user interface 102 to manually enter appropriate data values. In some embodiments, the user can be prompted to enter certain types of values. For example, if the module 107-8 ordinarily produces a string, the user may be prompted to enter a string. If the module 107-8 ordinarily produces a floating point number, the user may be prompted to enter a floating point number. Etc. In some embodiments, the user may be prompted with suggested data values. These values could be predefined values, randomly generated values, cached values produced by other graphs, etc.

In some embodiments, the graph execution engine 116 can randomly generate upstream values and provide them automatically to modules and/or present them to the user as suggested values. The values can be generated using a schema. Thus, for example, a schema can indicate what types of values are produced by a given module. When values are needed, the values can be randomly generated using the schema. Thus, for example, if the schema indicates that a string is generated by module 107-8, then the graph execution engine can generate a random string when executing the sub-portion 108-1 that can be provided to the module 107-11.

In some embodiments, when values are needed from upstream modules to execute a sub-portion 108-1 of a graph, links to values may be used. For example, the graph execution engine 116 may have URLs or other pointers that direct the graph execution engine 116 to locations where sample values can be obtained. Alternatively or additionally, the user interface 102 can be used to allow a user to specify links to values.

Figure 1C:
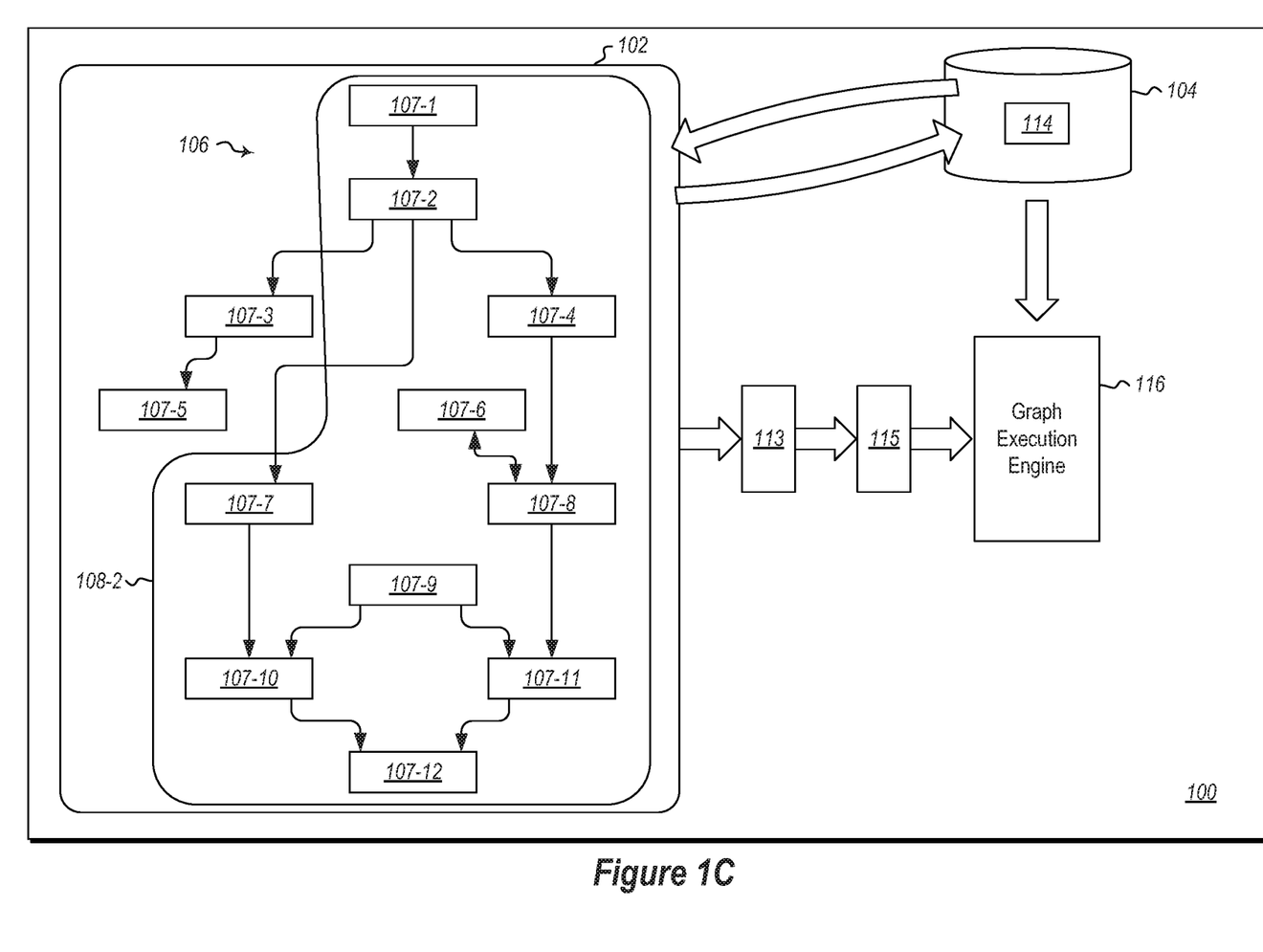
FIG. 1C illustrates selection of additional graph elements for execution of a partial graph.

In some embodiments, the graph execution engine 116 may identify to the user other modules that should be selected to execute a sub-portion. For example, in FIG. 1A, the user selects sub-portion 108-1 to be executed. The execution engine 116 determines that for this sub-portion to be executed, modules 107-1, 107-2, 107-4, 107-6, 107-7, and 107-8 also need to be executed. These can be suggested in the user interface 102 to the user directing the user to also select these modules as part of a partial graph execution. If the user accepts these suggestions, then, as illustrated in FIG. 1C, the sub-portion 108-2 is selected to be executed instead of the sub-portion 108-1. In this way, all values from upstream modules will be obtained. If the user chooses not to select one or more of the suggested modules, data can be obtained in other ways, such as the ways suggested above.

In some embodiments, a user may not be given a choice of whether or not to execute upstream modules, but rather, any upstream modules will be executed if data is needed from those modules. In this case, while the user has selected the sub-portion 108-1 to execute, the graph execution engine 116 will identify and execute the modules in the sub-portion 108-2, potentially transparently to the user.

Figure 1D:
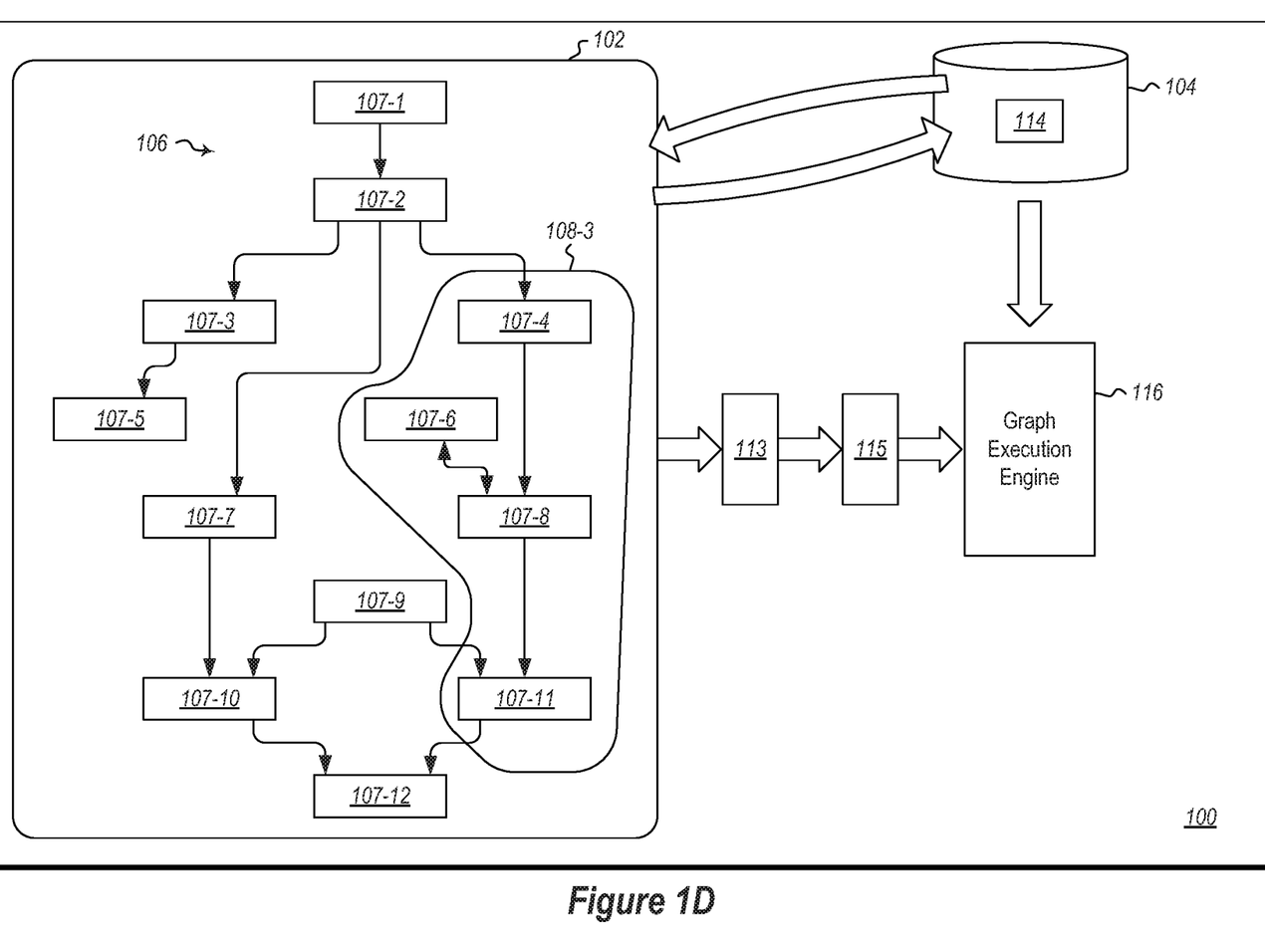
FIG. 1D illustrates selection of a sub-portion of graph modules by a user.

Embodiments are implemented where executing modules is limited by user selection. In particular, as illustrated above, non-upstream modules not selected by a user are not executed during a partial execution. Upstream modules need not be executed in the partial execution when the data from those modules can be obtained elsewhere such as when cached data from upstream modules is available from a previous execution, when user input data can be used in place of data produced by upstream modules, when random data can be used in place of data from upstream modules, etc. Alternatively only those upstream modules that produce data needed, either directly or indirectly, by user selected modules are executed. Embodiments are implemented where modules downstream from user selected modules are not executed. Thus, for example, FIG. 1D illustrates an example where a sub-portion 108-3 is selected by a user. This sub-portion 108-3 includes modules 107-4, 107-6, 107-8, and 107-11. In the illustrated example, modules 107-3, 107-5, 107-7, 107-10, and 107-12 are not upstream from the user selected modules as they produce no data that flows to the user selected modules in the sub-portion 108-3. Modules 107-1, 107-2 and 107-9 are upstream modules to the modules 108-3. In some embodiments, these modules will also be executed when the sub-portion 108-3 is executed. However, in other embodiments, data for these modules will be obtained from other sources as illustrated above. Execution of the sub-portion 108-3 stops at module 107-11 such that downstream modules, in this case module 107-12, are not executed.

In the example illustrated in FIGS. 1A-1D, the user interface is coupled to an experimentation service 113. The experimentation service 113 is a service layer of logic that resides between the user interface layer and the job execution service 115 described below. The experimentation service 113 may be constructed using processors, memory and software stored on the memory and executed by the processors, using firmware, using programmable logic devices, etc. The experimentation service 113 filters out modules that should not be run in a partial execution scenario based on the modules selected by a user in the user interface 102. Such filtering may filter out any modules not selected by a user in the user interface 102, or as illustrated above, any modules not selected by the user and not needed as upstream nodes of modules selected by the user. The job execution service 115 is the logic layer that takes a graph, parses it into jobs (individual steps), sends a job to the graph execution engine 116, harnesses the result, and then repeats with the next job. The job execution service 115 and graph execution engine 116 may be constructed using processors, memory and software stored on the memory and executed by the processors, using firmware, using programmable logic devices, etc.

In some embodiments, when a partial run is executed, cached module data downstream from the selected modules becomes "suspect". While cached data from a previous run may be available, it is out-of-date and potentially incorrect. For this reason, in some embodiments, a downstream module will be marked as "Not Executed" when a partial run is initiated. Thus for example, in the example illustrated in FIG. 1D, the module 107-12 will be marked as "Not Executed" and any cached data for the module 107-12 will not be used for other partial runs (although in this example, that is irrelevant as the module 107-12 is not upstream to any other modules).

Another side effect of partial runs is their interaction with experiment run history. In some systems, a partial run will not be distinguishable from a full experiment run in regards to the run history. If it fails, embodiments can display "Failed" in a run history (such as the run history 402 illustrated and discussed below in conjunction with FIG. 4), if it passes embodiments can display "Finished" in the run history, etc.

In some embodiments, a single module may be executed. This may be particularly useful when executing scripting modules. Scripting modules (Python, R, SQL, etc.) generally go through several iterations as the code is being written. While a user is working on each iteration, previously they needed to execute the entire graph in order to validate that their incremental changes were behaving as expected. This is a time consuming process, particularly if the scripting module is deep in the graph and has upstream modules that are re-executed due to non-determinism.

Embodiments herein can allow a user to be able to make quick iterations on changes to their script, simply executing the module that they are changing and using cached upstream values, or otherwise obtained values as illustrated above, then halting execution after the module completes.

Figure 3:
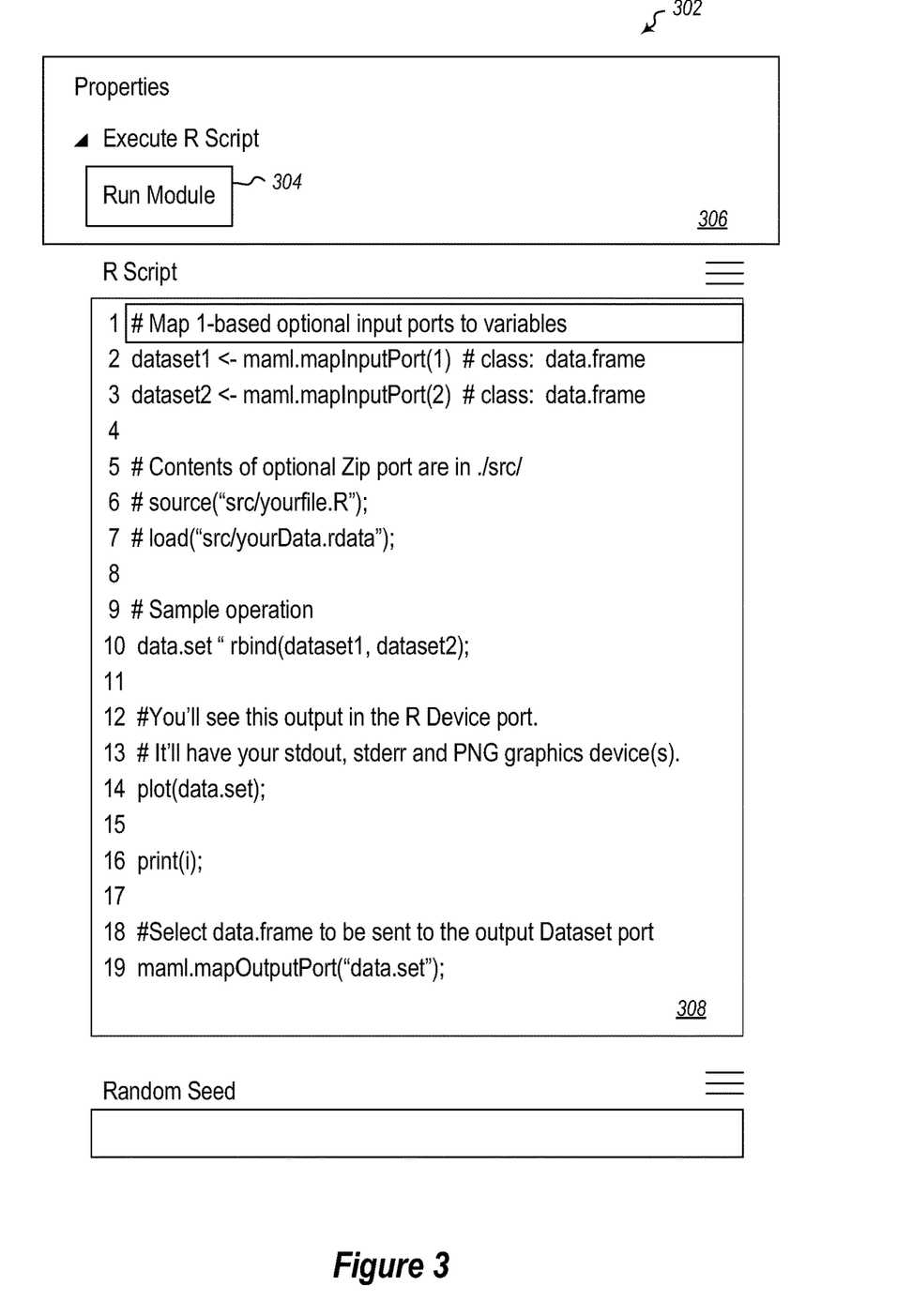
FIG. 3 illustrates additional user interface elements.

FIG. 3 illustrates an example user interface that can be used to allow a user to make use of this functionality. FIG. 3 illustrates a user interface element 302 that can be displayed in the user interface 102. In the example illustrated embodiments place an "execute script module" gesture in close proximity to the area the user will be working. In this example, this is the user interface element 302, which is a script box. A "Run Module" button 304 is placed in a properties pane 306, above the script area 308.

When a user clicks run button 304, if cached input data is available from the cache 114 from previous upstream execution, in some embodiments, it will be used regardless of the deterministic behavior of any upstream module. This means that if non-deterministic modules are feeding a script module, and the script module is executed in isolation—the non-deterministic module's cached values will be used rather than re-executing. If upstream cached data is missing, then the necessary upstream modules will be executed first prior to executing the scripting module.

After execution of the module in isolation, downstream data as well as run history become suspect. To fit in with current behavior, one way to address downstream data is to remove it from the cache 114.

Figure 4:
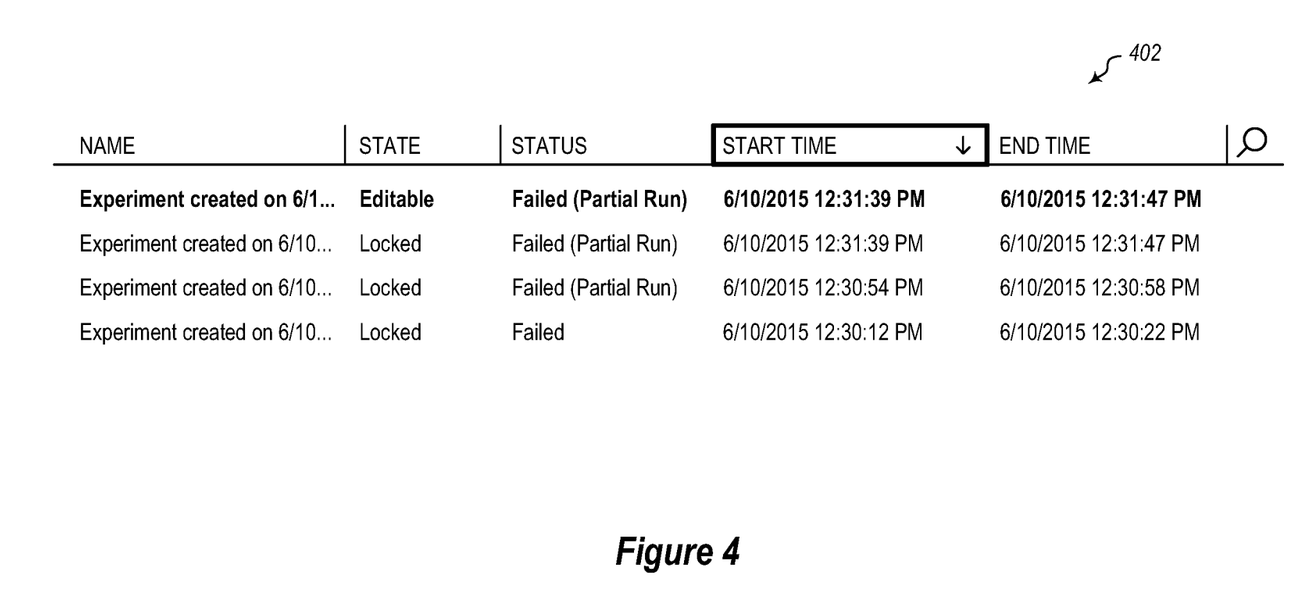
FIG. 4 illustrates a run history that can be displayed to a user in a graphical user interface.

Run history can be updated to show that an incomplete passing or failing experiment was executed. These can be shown by simply appending "(Partial Run)" to the status. For example, FIG. 4 illustrates a run history 402 that shows partial executions that can be displayed to a user in the user interface 102.

On the backend, communication from the user interface 102 to the graph execution engine 116 describing that only a single module should be executed could be implemented in a number of ways. For example, in one embodiment, embodiments may include a new graph execution call that takes a second argument describing which modules to execute. Alternatively or additionally, embodiments may implement a new serialized module field to the graph. Each module will have an "ExcludeFromExecution" flag that defaults to false. Alternatively or additionally, embodiments may repurpose a "Mask" module field used for masking and do the same with it as described above for the "ExcludeFromExecution" field. "Masking" is the idea of commenting out a block or excluding it from execution. Embodiments could "mask" a particular module and run the entire experiment (i.e., not just a partial graph run)—but the masked module would not execute.

In the embodiments where a new serialized module field to the graph is implemented, single module execution can be communicated from the user interface 102 to the experimentation service 113 via a serialized module parameter in the graph (e.g., "ExcludeFromExecution"). Single module execution flips these bits accordingly to convey to the experimentation service 113 that potentially only a sub-portion (in this case, one) of modules should be executed. Experimentation service 113 code honors these flags, only sending a sub-portion of module tasks to the job execution service 115 in a submitted job. Thus, the experimentation service 113 filters out modules that should not be run in a partial execution scenario. The job execution service 115 is the logic layer that takes a graph, parses it into jobs (individual steps), sends a job to the graph execution engine 116, harnesses the result, and then repeats with the next job.

On the user interface side, when an individual module is being executed, the graph being sent to experimentation service 113 for execution has the "ExcludeFromExecution" field flipped to true with the exception of the single module being executed. The 'Run Module' button 304 is located in the properties pane 306 for the scripting module and when clicked will cause the graph to be forwarded to the graph execution engine 116, such as by sending to a REST API used by a 'Run' method—after the graph has been updated to indicate which modules should be excluded from execution.

The following now illustrates details with respect to allowing a user to manage execution of non-deterministic modules. Non-deterministic modules will have different outputs on different runs, even when inputs into those modules are the same between the different runs. This could be caused due to random functions, race conditions, approximation techniques, etc.

Figure 5:
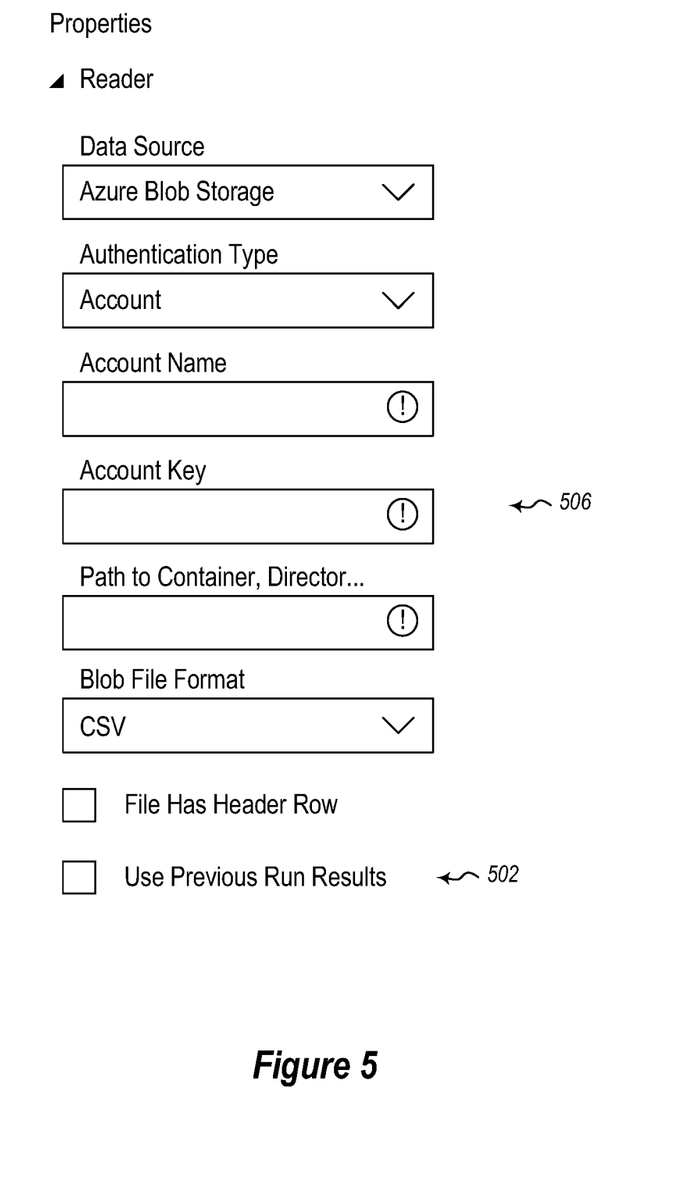
FIG. 5 illustrates additional user interface elements.

In some graph systems there are modules (e.g., I/O modules) that will execute on every experiment executed, regardless of whether or not the data they are using or outputting has changed. In some embodiments illustrated herein, as shown in FIG. 5, users will be presented with a check box or other appropriate interface, such as the check box 502, such as in the properties pane for non-deterministic modules (including custom modules). If a user selects the check box 502, then the module is not re-executed and previously cached data may be used. To maintain backwards compatibility and also preserve semantics that are generally thought to be correct, in some embodiments, the default state of this check box will be unchecked (i.e. non-deterministic behavior).

In the event that this box is checked by a user, but parameter values have been changed on the module or new data is being fed into it, the checkbox will not be honored and the module will re-execute (similar to the behavior of deterministic modules). In addition, if previous run results are not available for the module then it will also execute.

In the illustrated example, the check box 502 is displayed as the bottom-most parameter in the properties pane 506 of any non-deterministic module.

In some embodiments, the parameter being exposed to toggle determinism will not be a parameter on the module in the traditional sense. Rather, the user interface can automatically add this parameter when displaying the properties pane of a non-deterministic module. This is done to ensure that toggling this parameter will not invalidate any existing cache. The user interface stores the state of this parameter as a new module field in the serialized experiment graph. When the graph is passed to the experimentation service 113 for execution, experimentation service 113 behavior will be altered to key off of the state of this field rather than the deterministic setting on the module itself. The generated module task will set the deterministic flag for the job execution service 113 appropriately. For the job execution service 113 to honor this setting, any cached data is available for this module. The job execution service 113 will unconditionally store cached outputs after execution, irrespective of the deterministic state of the task.

Some embodiments allow for a user to mark a module as "do-not-execute". This has the effect of halting graph execution for that particular branch. This may be done to disable modules with side-effects, to disable branches of an experiment that are erroring out, etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
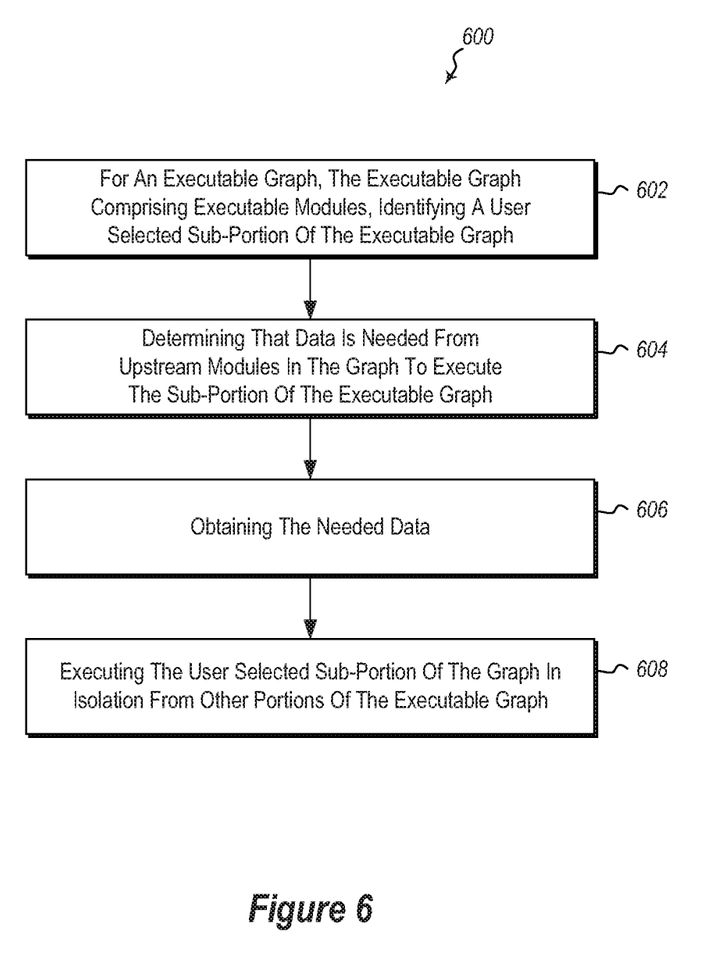
FIG. 6 illustrates a method of executing a user selected portion of an executable graph.

Referring now to FIG. 6, a method 600 is illustrated. The method 600 includes acts for executing a user selected portion of an executable graph. The method 600 includes, for an executable graph, the executable graph comprising executable modules, identifying a user selected sub-portion of the executable graph (act 602).

The method 600 further includes determining that data is needed from upstream modules in the graph to execute the sub-portion of the executable graph (act 604).

The method 600 further includes obtaining the needed data (act 606). This may be done in some embodiments without executing any modules that do not need to be executed to obtain the needed data. In some embodiments, this may be done by not executing any modules not selected by the user. For example, these embodiments could use cached data, randomly generated data, and/or user input data.

The method 600 further includes executing the user selected sub-portion of the graph in isolation from other portions of the executable graph (act 608). In some embodiments, this includes halting execution at the end of the user selected sub-portion of the graph.

The method 600 may be practiced where obtaining the needed data comprises obtaining cached values from one or more previous executions of relevant upstream modules.

The method 600 may further include identifying for the user additional modules that need to be executed to obtain at least a portion of the needed data and suggesting to the user that the user select those modules as well.

The method 600 may further include identifying for the user additional modules that need to be executed to obtain at least a portion of the needed data and automatically selecting the additional modules for the user.

The method 600 may be practiced where obtaining the needed data comprises forcing use of cached values obtained from one or more previous executions of non-deterministic modules to be used, even though upstream modules produced non-deterministic results.

The method 600 may be practiced where obtaining the needed data comprises prompting a user to identify values. For example, prompting a user to identify values may include prompting a user to manually input values. Alternatively or additionally, prompting a user to identify values includes prompting a user to accept suggested input values. Alternatively or additionally, prompting a user to identify values includes prompting a user to identify a pointer to where values can be obtained. For example, the user can provide a URL or other pointer to a location where data can be obtained.

The method 600 may be practiced where obtaining the needed data comprises using randomly generated data. In some embodiments, the randomly generated data is generated according to a schema.

Figure 7:
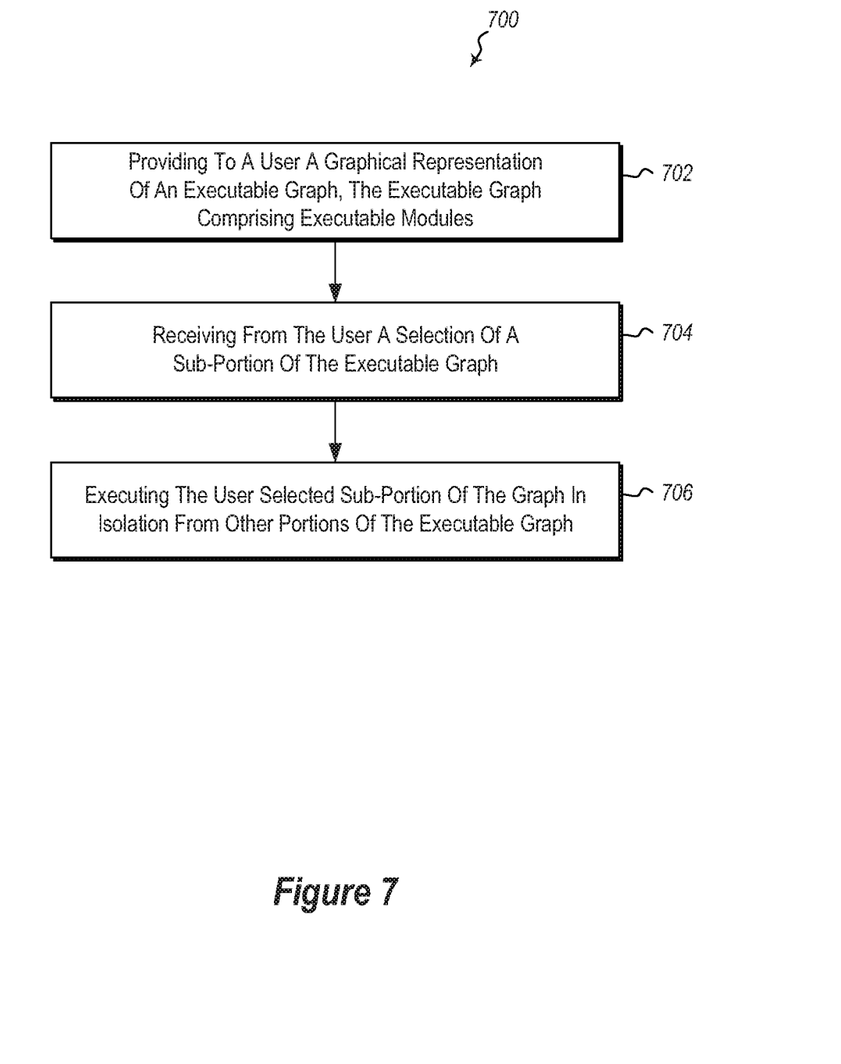
FIG. 7 illustrates a method of a user defined portion of an executable graph.

Referring now to FIG. 7, a method 700 is illustrated. The method 700 includes acts for executing a user defined portion of an executable graph. The method includes providing to a user a graphical representation of an executable graph, the executable graph comprising executable modules (act 702).

The method 700 further includes receiving from the user a selection of a sub-portion of the executable graph (act 704).

The method 700 further includes executing the user selected sub-portion of the graph in isolation from other portions of the executable graph (act 706).

The method 700 may further include determining that data is needed from upstream modules in the graph to execute the sub-portion of the executable graph and obtaining the needed data. In some such embodiments, the method 700 may be practiced where obtaining the needed data comprises obtaining cached values from one or more previous executions of relevant upstream modules. Alternatively or additionally, obtaining the needed data may include prompting a user in the user interface to identify values. Prompting a user to identify values may include prompting a user to manually input values. Alternatively or additionally, prompting a user to identify values may include prompting a user to accept suggested input values. Alternatively or additionally, prompting a user to identify values may include prompting a user to identify a pointer to where values can be obtained.

The method 700 may further include identifying for the user in the user interface, additional modules that need to be executed to obtain at least a portion of the needed data and suggesting to the user that the user select those modules as well.

The method 700 may further include identifying for the user in the user interface, additional modules that need to be executed to obtain at least a portion of the needed data and automatically selecting the additional modules for the user.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing a partial execution of an executable graph by executing a user selected portion of an executable graph, the method comprising:
    receiving user input selecting a sub-portion of the executable graph while not selecting other portions of the executable graph, the executable graph comprising executable modules;
    filtering out modules that should not be run in the partial execution of the executable graph from the executable graph by filtering out modules not selected by the user input;
    determining that upstream data is needed from upstream modules in the executable graph, the upstream modules included in the filtered out modules, to execute the sub-portion of the executable graph;
    obtaining the upstream data from elsewhere than the upstream modules, wherein obtaining the upstream data from elsewhere comprises prompting the user to enter data values or to accept suggested data values; and
    executing the user selected sub-portion of the executable graph, without executing the filtered out modules, as a result of obtaining the upstream data from elsewhere than the upstream modules.

2. The method of claim 1, wherein prompting the user to enter data values or to accept suggested data values comprises prompting a user to manually input values.

3. The method of claim 1, wherein prompting the user to enter data values or to accept suggested data values comprises prompting a user to accept suggested input values.

4. The method of claim 1, wherein prompting the user to enter data values or to accept suggested data values comprises prompting a user to identify a pointer to where values can be obtained.

5. The method of claim 1, wherein prompting the user to enter data values or to accept suggested data values comprises prompting a user to accept suggested randomly generated data.

6. The method of claim 5, wherein the randomly generated data is generated according to a schema.

7. The method of claim 1, wherein prompting the user to enter data values or to accept suggested data values comprises prompting a user to accept cached values from one or more previous executions of relevant upstream modules.

8. The method of claim 1, further comprising:
    identifying for the user additional modules that need to be executed to obtain at least a portion of the needed upstream data; and
    as a result, receiving from the user, input selecting one or more of the additional modules.

9. A computer system comprising:
    one or more processors; and
    one or more computer-readable media having stored thereon instructions that are executable by the one or more processors to configure the computer system to perform a partial execution of an executable graph by executing a user selected portion of a graph, including instructions that are executable to configure the computer system to perform at least the following:

receive user input selecting a sub-portion of the executable graph while not selecting other portions of the executable graph, the executable graph comprising executable modules;

filtering out modules that should not be run in the partial execution of the executable graph from the executable graph by filtering out modules not selected by the user input;

determine that upstream data is needed from upstream modules in the executable graph, the upstream modules included in the filtered out modules, to execute the sub-portion of the executable graph;

obtaining the upstream data from elsewhere than the upstream modules, wherein obtaining the upstream data from elsewhere comprises prompting the user to enter data values or to accept suggested data values; and execute the user selected sub-portion of the executable graph, without executing the filtered out modules, as a result of obtaining the upstream data from elsewhere than the upstream modules.

10. The system of claim 9, wherein prompting the user to enter data values or to accept suggested data values comprises prompting a user to manually input values.

11. The system of claim 9, wherein prompting the user to enter data values or to accept suggested data values comprises prompting a user to accept suggested input values.

12. The system of claim 9, wherein prompting the user to enter data values or to accept suggested data values comprises prompting a user to identify a pointer to where values can be obtained.

13. The system of claim 9, wherein prompting the user to enter data values or to accept suggested data values comprises prompting a user to accept suggested randomly generated data.

14. The system of claim 13, wherein the randomly generated data is generated according to a schema.

15. The system of claim 9, wherein prompting the user to enter data values or to accept suggested data values comprises prompting a user to accept cached values from one or more previous executions of relevant upstream modules.

16. The system of claim 9, wherein one or more computer-readable media have stored thereon instructions that are executable by the one or more processors to configure the computer system to:

identify for the user additional modules that need to be executed to obtain at least a portion of the needed upstream data; and as a result, receiving from the user, input selecting one or more of the additional modules.

17. A computer-readable storage media having stored thereon instructions that are executable by one or more processors to configure a computer system to perform a partial execution of an executable graph by executing by executing a user selected portion of a graph, including instructions that are executable to configure the computer system to perform at least the following:

receive user input selecting a sub-portion of the executable graph while not selecting other portions of the executable graph, the executable graph comprising executable modules;

filtering out modules that should not be run in the partial execution of the executable graph from the executable graph by filtering out modules not selected by the user input;

determine that upstream data is needed from upstream modules in the executable graph, the upstream modules included in the filtered out modules, to execute the sub-portion of the executable graph;

obtaining the upstream data from elsewhere than the upstream modules, wherein obtaining the upstream data from elsewhere comprises prompting the user to enter data values or to accept suggested data values; and execute the user selected sub-portion of the executable graph, without executing the filtered out modules, as a result of obtaining the upstream data from elsewhere than the upstream modules.

18. The computer-readable storage media of claim 17, wherein prompting the user to enter data values or to accept suggested data values comprises prompting a user to accept suggested input values.

19. The computer-readable storage media of claim 17, wherein prompting the user to enter data values or to accept suggested data values comprises prompting a user to identify a pointer to where values can be obtained.

20. The computer-readable storage media of claim 17, wherein prompting the user to enter data values or to accept suggested data values comprises prompting a user to accept suggested randomly generated data.

* * * * *